United States Patent
Maruchi et al.

(10) Patent No.: US 7,477,477 B2
(45) Date of Patent: Jan. 13, 2009

(54) HARD DISK DRIVE AND COMMAND EXECUTION METHOD

(75) Inventors: Kohei Maruchi, Tokyo (JP); Shinji Takakura, Yokohama (JP); Mitsunobu Yoshida, Kawasaki (JP); Toshikatsu Akiba, Kisarazu (JP); Hiroaki Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/858,354

(22) Filed: Sep. 20, 2007

(65) Prior Publication Data

US 2008/0144209 A1    Jun. 19, 2008

(30) Foreign Application Priority Data

Dec. 15, 2006    (JP)    ............................ 2006-338368

(51) Int. Cl.
*G11B 5/596*    (2006.01)
*G06F 12/00*    (2006.01)
*G06F 7/04*    (2006.01)

(52) U.S. Cl. ...................... 360/78.08; 360/75; 711/100; 726/26

(58) Field of Classification Search ........................ None
See application file for complete search history.

(56) References Cited

U.S. PATENT DOCUMENTS 4,530,055 A  *  7/1985  Hamstra et al. ............. 711/136

FOREIGN PATENT DOCUMENTS

| JP | 06-282384 | 10/1994 |
|---|---|---|
| JP | 09-073618 | 3/1997 |
| JP | 2000-040317 | 2/2000 |
| JP | 2000-293963 | 10/2000 |
| JP | 2001-100935 | 4/2001 |
| JP | 2001-236744 | 8/2001 |

* cited by examiner

*Primary Examiner*—K. Wong
(74) *Attorney, Agent, or Firm*—Amin, Turocy & Calvin, LLP

(57) ABSTRACT

There is provided with command execution method, including; detecting a use situation of a non-volatile memory; selecting, when the use situation is low, the command which enables the disk head to be located at a start position of writing or reading most rapidly from among the write commands and the read commands assuming that the disk head performs the fast seek for the write command and the slow seek for the read command; selecting, when the use situation of the non-volatile memory is high, the command which enables the disk head to be located at the start position of writing or reading most rapidly from among the write commands and the read commands assuming that the disk head performs the slow seek.

11 Claims, 16 Drawing Sheets

HARD DISK DRIVE AND COMMAND EXECUTION METHOD

CROSS-REFERENCE TO RELATED APPLICATIONS

This application is based upon and claims the benefit of priority from the prior Japanese Patent Applications No. 2006-338368 filed on Dec. 15, 2006, the entire contents of which are incorporated herein by reference.

BACKGROUND OF THE INVENTION

1. Field of the Invention

The present invention relates to a hard disk drive for executing a read or write command sent from a host, and a command execution method.

2. Related Art

In a magnetic disk device representing a hard disk device, in the reading or writing of the disk, the disk head seeks to a target track, and the disk position at the target address is moved under the head while the head positioning control is performed, waiting for the disk to be rotated in a rotational delay. The reading or writing of data on the disk is started from the time when the disk head is located at the target address. If an error occurs, a retry is performed by halting the reading or writing, waiting for the disk to be rotated once and making the reading or writing again. Since the retry is continued until the error is resolved, there occurs a rotational delay for at least one rotation of the disk until the execution of the next command is started.

The writing onto the disk needs the severe positioning control than the reading, whereby an error occurs more easily. Since there occurs a rotational delay for one or more rotations of the disk every time a write fault in which the writing on the disk fails occurs, the command execution time can be expeditious by reducing the number of write faults.

Some of the disk devices have a command queue for holding a plurality of commands. In such a disk device, the command received from the host apparatus is stored in the command queue, and the command to be executed next is selected from the commands stored in the command queue and waiting for execution and executed. Using the command queue, the reordering that is changing the order of commands to be executed differently from the issuing order of commands is allowed. The time required for executing the command can be shortened by making the reordering in consideration of the position of a command request address on the disk. For example, consider an instance where the commands are issued in the order of commands 1, 2 and 3, as shown in FIG. 14. In this instance, the reading or writing of data can be performed more efficiently by reordering and executing (disk access) the commands in the order of commands 1, 3 and 2 as shown in FIG. 14A than executing the commands in the issued order as shown in FIG. 14B. In FIGS. 14A and 14B, the areas on the disk to be read or written by the commands 1, 2 and 3 are indicated.

An STF (Shortest Time First) algorithm is one of the reordering algorithms for selecting the command having the shortest access time and performing this in repeating fashion. For example, suppose that the command 1 (the area on the disk to be read or written by the command 1 is indicated) is being executed, as shown in FIG. 15. In the STF algorithm, the command 3 is selected as the command to be executed at the next time. The command 2 passes the head position by rotation of the disk during the seek, causing an excess rotational delay for one rotation of the disk (after the end of seek, waiting for the read or write data to be located), and is not selected. After the end of executing the command 3, the command 4 is in time for the seek, whereby the command to be executed next to the command 3 is the command 4 that can be accessed most rapidly.

When the seek speed (head moving speed) is increased, the moving time between tracks is shortened. When the seek speed is not increased as shown in FIG. 16B, the command 2 cannot be selected as the next command of the command 1, but the command 3 is executed. When the seek speed is increased, the commands 1, 2 and 3 can be executed within the same period of time (FIG. 16A), whereby more commands can be executed. In this manner, if the seek speed is increased, it is possible to make more efficient reordering in accordance with the STF algorithm.

However, when the seek speed is increased, a greater vibration is passed to the head in settling the head position at the target track. As this vibration is greater, the positioning control is more difficult to cause a read/write fault more easily. Hence, if the seek speed is increased, more efficient reordering is enabled, but the write fault occurrence rate is higher, and the rotational delay time is increased, whereby the throughput is not necessarily improved.

In JP-A 6-282384 (Kokai), data that fails to write on the disk is stored in a flash memory as an alternative area of the defective sector on the disk to improve the reliability of the disk. With this method, it is expected that the throughput is improved for a random write command (write command in which the write destination address is random) having a small data size, but no process for a sequential write command (write command in which the write destination address is consecutive) or a write command having a large data size is performed in view of the improved throughput. Also, since there is no process for rewriting the data stored in the flash memory onto the disk, the process for writing the write failed data due to occurrence of the write fault into the flash memory cannot be performed when there is no available storage space of the flash memory.

In JP-A 2000-293963 (Kokai), data that fails to write on the disk is stored in a specific area on the disk. With this method, the throughput is not necessarily improved, because the rotational delay time occurs due to the seek for storing the data in the specific area.

In JP-A 2001-100935 (Kokai), data that fails to read or write on the disk is stored again in the disk command queue for reordering. With this method, the disk write for the data that causes the write fault is indispensable, whereby the penalty for write fault is not necessarily reduced. For example, after a write failure, the failed data is restored to the disk command queue, and the same command is selected as a result of reordering, as shown in FIG. 17. In this case, the operation is the same as the rewrite after waiting for one rotation of the disk, which is the process without reordering, whereby even if the process of restoring the data to the disk command queue and reordering is performed, the throughput is not improved.

In JP-A 2001-236744 (Kokai), when the reading from or writing onto the disk fails and the retry is needed, the executable command is searched in the interim. With this method, like JP-A 2001-100935 (Kokai), the writing of data causing the write fault on the disk is indispensable, whereby the penalty of write fault is not necessarily reduced.

SUMMARY OF THE INVENTION

According to an aspect of the present invention, there is provided with a hard disk drive comprising:

a disk-like storage medium configured to be capable of reading and writing data;

a seek controller configured to control a disk head to make a fast seek of seeking the disk head at high speed or a slow seek of seeking the disk head at low speed to read or write the data based on a read command or a write command requested for execution;

a non-volatile memory configured to be capable of reading and writing the data;

an access controller configured to read or write the data from or into the non-volatile memory based on the read command or the write command requested for execution;

a command receiver configured to receive the write command or the read command of reading or writing the data from a host;

a decision unit configured to decide which of the seek controller and the access controller performs the command received by the command receiver;

a first command storage configured to store write commands and read commands decided to be executed by the seek controller;

a second command storage configured to store write commands and read commands decided to be executed by the access controller;

a first selection unit configured to select the command from the second command storage and request the access controller to execute selected command;

a use situation detection unit configured to detect a use situation of the non-volatile memory;

a second selection unit configured to select, when the use situation is low, the command which enables the disk head to be located at a start position of writing or reading most rapidly from among the write commands and the read commands stored in the first command storage assuming that the disk head performs the fast seek for the write command and the slow seek for the read command and request the seek controller to execute selected command by designating the fast seek if the selected command is the write command and by designating the slow seek if the selected command is the read command;

a write error processing unit configured to detect a write error during execution of the write command requested by the second selection unit and store a write command for writing write failed data, in the second command storage; and a third selection unit configured to select, when the use situation of the non-volatile memory is high, the command which enables the disk head to be located at the start position of writing or reading most rapidly from among the write commands and the read commands stored in the first command storage assuming that the disk head performs the slow seek and request the seek controller to execute selected command by designating the slow seek.

According to an aspect of the present invention, there is provided with a command execution method performed in a hard disk drive which includes a disk-like storage medium configured to be capable of reading and writing data and a non-volatile memory configured to be capable of reading and writing data, comprising;

receiving a write command and a read command of reading or writing the data from a host;

deciding for which of the disk-like storage medium and the non-volatile memory to execute the write command or the read command;

store the write command or the read command in a first command storage when the disk-like storage medium is decided and in a second command when the non-volatile memory is decided;

detecting a use situation of the non-volatile memory;

selecting, when the use situation is low, the command which enables the disk head to be located at a start position of writing or reading most rapidly from among the write commands and the read commands stored in the first command storage assuming that the disk head performs the fast seek for the write command and the slow seek for the read command;

executing selected command by the fast seek when the selected command is the write command and by the slow seek when the selected command is the read command;

store write command for writing write failed data, in the second command storage when a write error is detected during execution of the write command;

selecting, when the use situation of the non-volatile memory is high, the command which enables the disk head to be located at the start position of writing or reading most rapidly from among the write commands and the read commands stored in the first command storage assuming that the disk head performs the slow seek; and executing selected command by the slow seek.

DETAILED DESCRIPTION OF THE INVENTION

Figure 1:
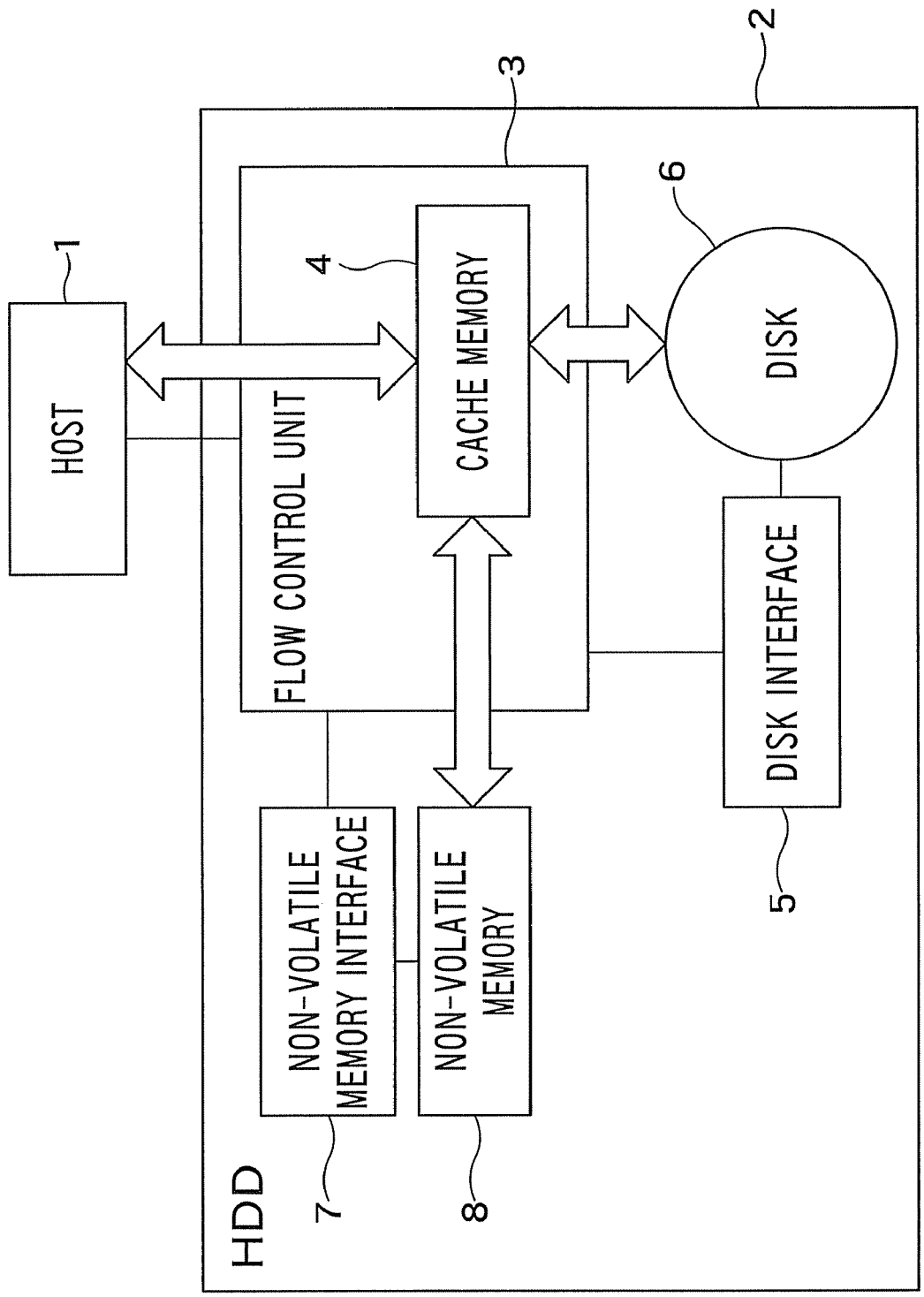
FIG. 1 is a block diagram showing the configuration of a hard disk drive (HDD: Hard Disk Drive) according to one embodiment of the present invention.

FIG. 1 is a block diagram showing the configuration of a hard disk drive (HDD: Hard Disk Drive) according to one embodiment of the present invention. The HDD 2 has a disk 6 and a non-volatile memory 8 as the storage devices. A host 1 issues a read/write command to a flow control unit 3 within the HDD 2. The flow control unit 3 issues the accepted read/write command to a disk interface 5, when the read/write command is performed on the disk 6, or issues the accepted read/write command to a non-volatile memory interface 7, when the read/write command is performed on the non-volatile memory 8. The block arrow in FIG. 1 indicates a bus. If the command issued from the host 1 is a read command, data requested by the read command is read from the disk 6 or the non-volatile memory 8 to a cache memory 4, and transferred from the cache memory 4 to the host 1. On the other hand, if the command issued from the host 1 is a write command, data requested by the write command is stored in the cache memory 4, and written onto the disk 6 or into the non-volatile memory 8.

Figure 2:
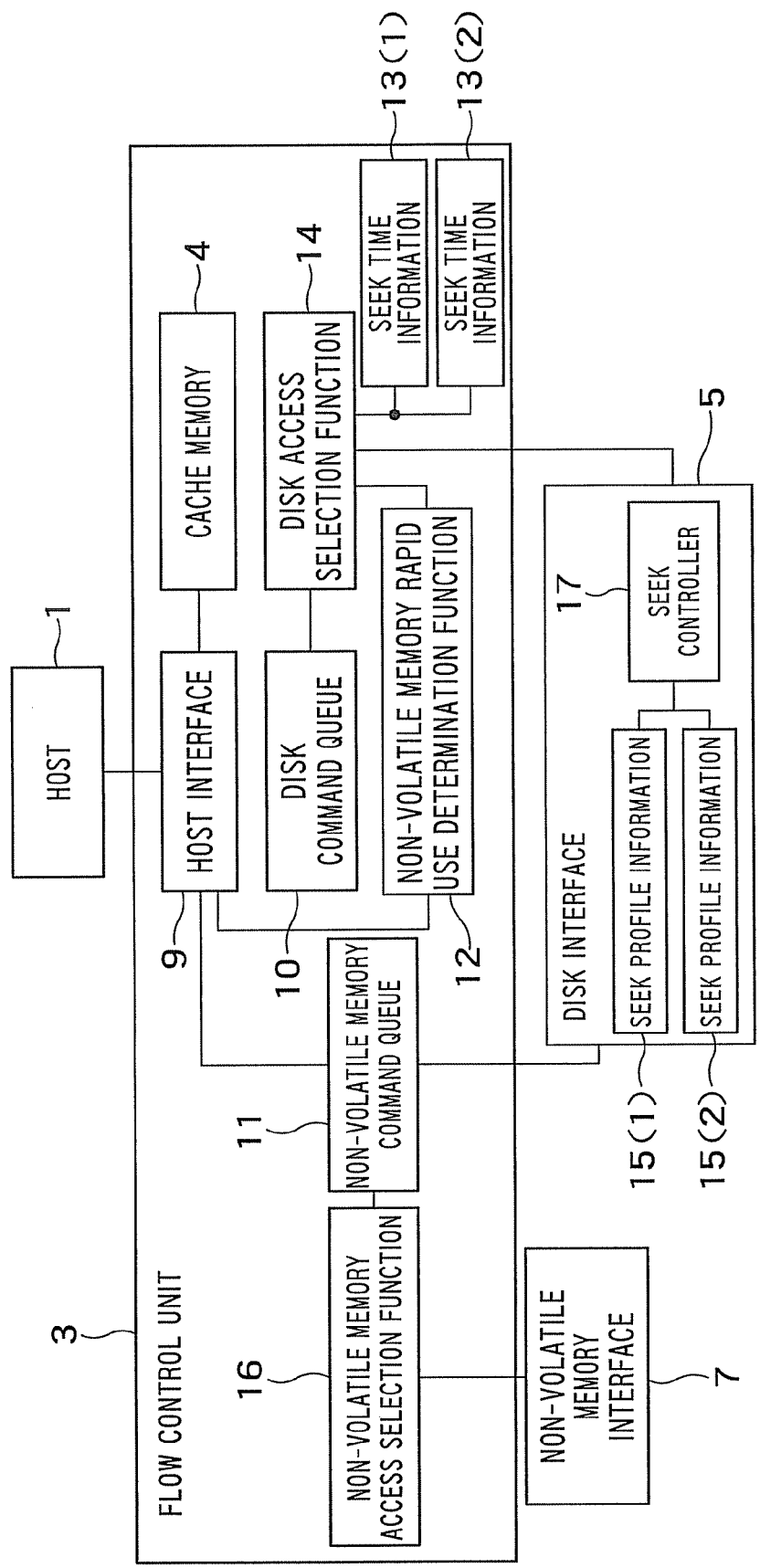
FIG. 2 is a block diagram showing the detailed configuration of the HDD as shown in FIG. 1.

FIG. 2 is a block diagram showing the detailed configuration of the HDD as shown in FIG. 1.

Figure 3:
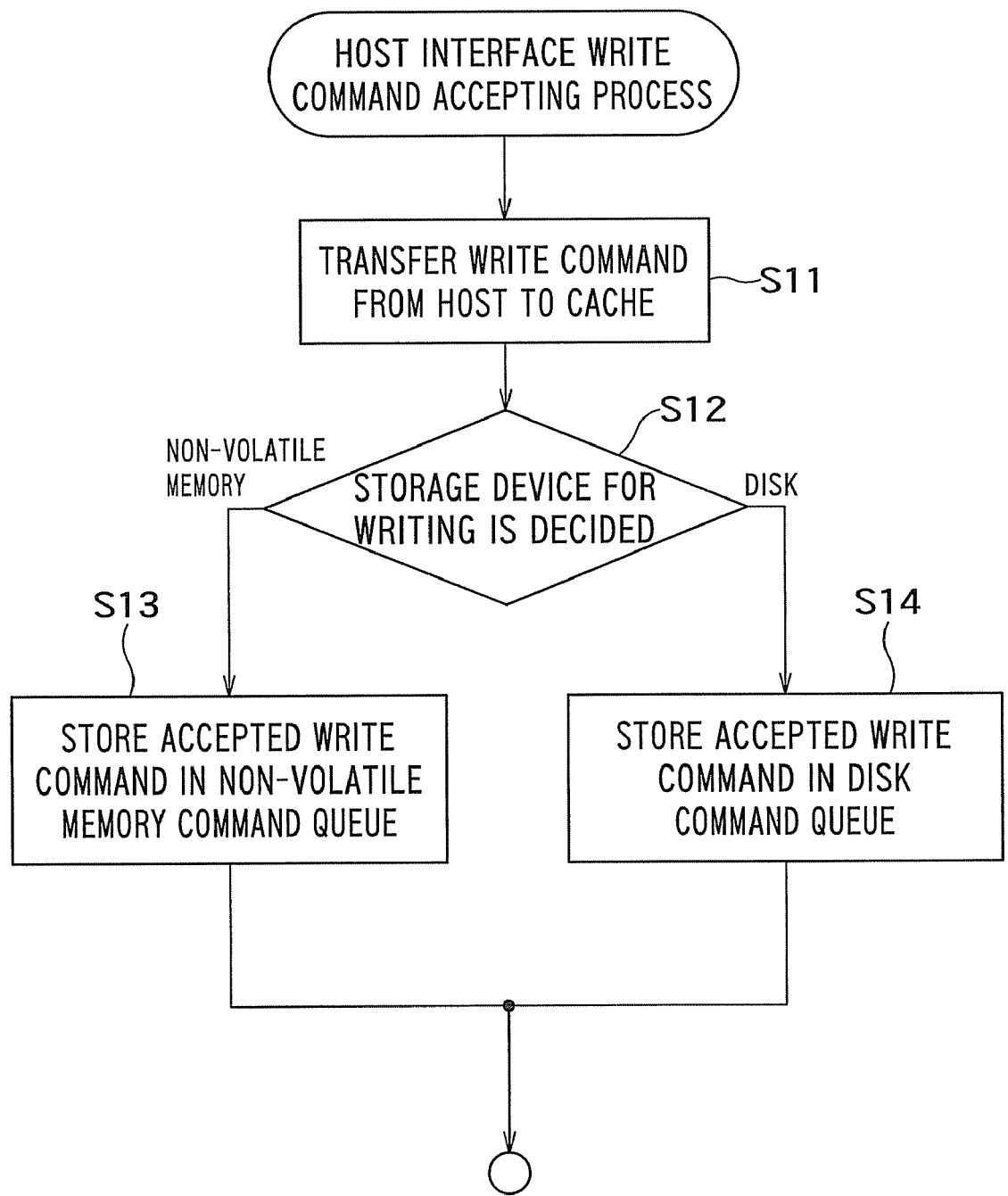
FIG. 3 is a flowchart for explaining a process to be performed where a write command is accepted.

The command issued from the host 1 is accepted by a host interface (command receiver, decision unit) 9 within the flow control unit 3. If the accepted command is a write command, a process as shown in a flowchart of FIG. 3 is performed.

First of all, the host interface 9 stores the accepted write command in the cache memory 4 (S11). The host interface 9 decides in which storage device of the disk 6 and the non-volatile memory 8 to write the write requested data by the write command (write data), depending on the designation from the host 1, the conditions of the disk 6 and the conditions of the non-volatile memory 8 (S12).

The designation from the host 1 means designating the storage device which the host 1 writes to. In this case, the write data is written to the designated storage device. The conditions of the disk 6 may include the rotation situation of the disk 6 and the number of commands (number of commands in the disk command queue 10) for access to the disk 6. When the disk 6 is not rotating, it takes time to rotate the disk 6. If the access to the disk 6 is concentrated, it takes time until the completion of writing the write data. In such a situation, it is not preferable to write on the disk 6. Also, the conditions of the non-volatile memory 8 may include the remaining storage amount of the non-volatile memory 8 and the number of commands (number of commands in a non-volatile memory command queue 11) waiting for access to the non-volatile memory 8. The remaining storage amount is the current amount of storage available on the non-volatile memory 8 from which a sum of size of request data of all the write commands stored in the non-volatile memory command queue 11 is subtracted. That is, the remaining storage amount of the non-volatile memory 8 is the amount of storage available on the non-volatile memory 8 after executing all the write commands stored in the non-volatile memory command queue 11. If the remaining storage amount of the non-volatile memory 8 is insufficient, the non-volatile memory 8 is not writable. Also, if there are a great number of commands for access, it takes time to write into the non-volatile memory 8. In such a situation, it is not preferable to write into the non-volatile memory 8.

Figure 18:
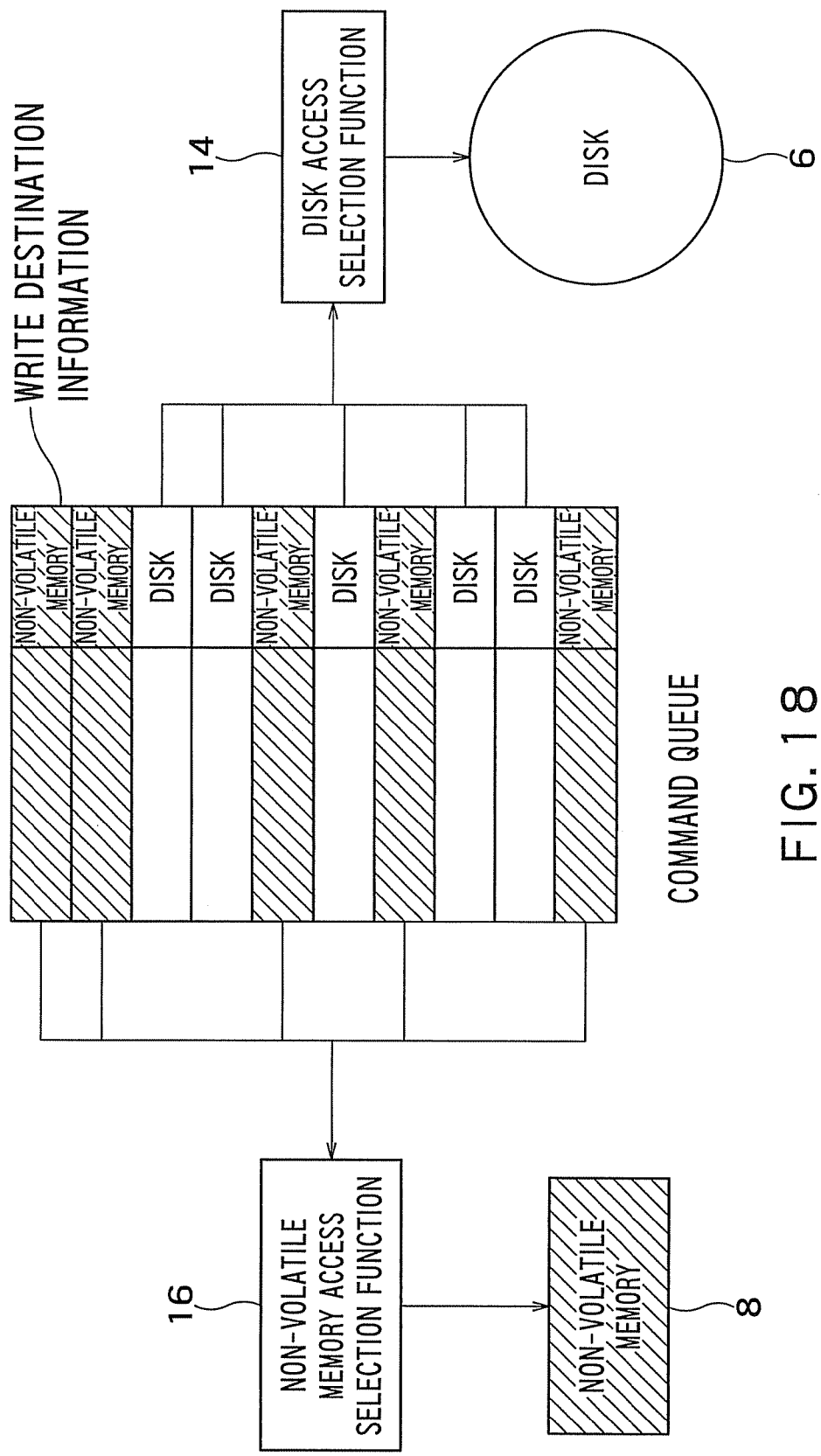
FIG. 18 is a view showing a single command queue.

In consideration of the conditions of the disk 6 and the conditions of the non-volatile memory 8, the storage device for writing is decided by calculating the efficiency of writing the storage device. The write command accepted by the host interface 9 is stored in the disk command queue (first command storage) 10 if the disk 6 is written, or the non-volatile memory 8 command queue (second command storage) 11 if the non-volatile memory 8 is written (S13 and S14). In an example of FIG. 3, the storage device for writing is any one of the disk 6 and the non-volatile memory 8, but both the disk 6 and the non-volatile memory 8 may be written. In this case, different data may be written to the storage devices by dividing the accepted write data, or the same data may be written to both the storage devices. In making this determination, a non-volatile memory rapid use determination function 12 may be used as will be described later. Also, the disk command queue 10 and the non-volatile memory command queue 11 may be combined into a single command queue. One example of the single command queue is shown in FIG. 18. The disk access selection function 14 and the non-volatile memory access selection function 16 (hereinafter described) can identify a command to be executed by itself from the single command queue by adding the write destination information for identifying whether the write destination is the non-volatile memory 8 or the disk 6 to the single command queue. That is, the first command storage and the second command storage may be physically integrated or separated, in which the invention may include any of these cases.

Figure 4:
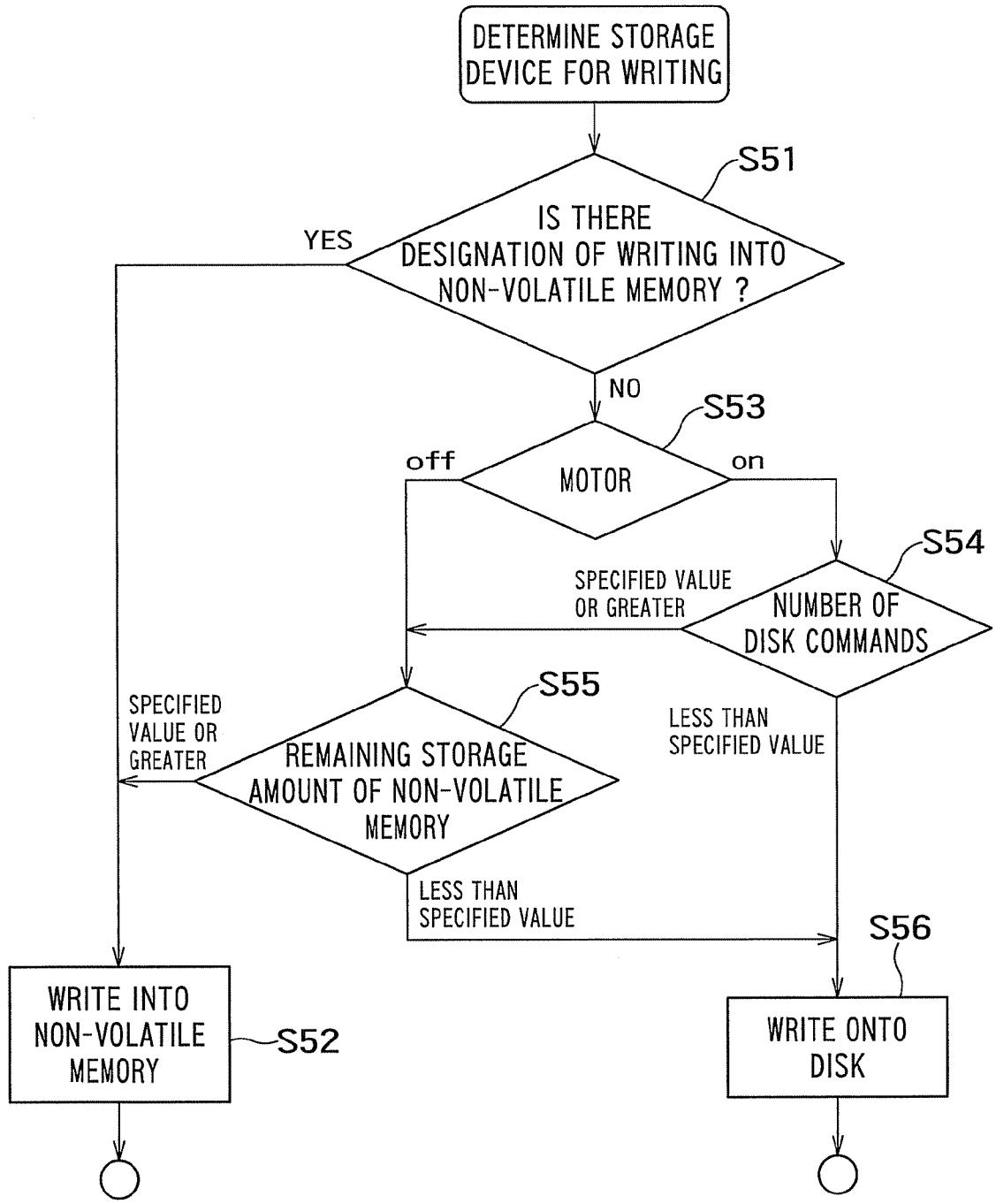
FIG. 4 is a flowchart for explaining the details at S12 of FIG. 3.

FIG. 4 is an example flowchart for explaining the details at S12 of FIG. 3. At S51, it is checked whether or not the write destination of write data is designated as the non-volatile memory 8. If the write destination is designated as the non-volatile memory 8 (YES at S51), the non-volatile memory 8 is decided as the storage device for writing (S52). If the write destination is not designated as the non-volatile memory 8 (NO at S51), it is checked whether or not the disk 6 is rotating (a motor for rotating the disk 6 is turned on or off (on/off)) at S53. If the disk 6 is rotating (on at S53), it is presupposed that the write data is written on disk 6. At S54, the number of commands (number of commands in the disk command queue 10) for the disk 6 is examined. If the number of commands is greater than or equal to a specified value, the non-volatile memory 8 is examined as the storage device for writing (S55). Also, at S53, if the disk 6 is not rotating (off at S53), the non-volatile memory 8 is examined (S55). At S55, the remaining storage amount of the non-volatile memory 8 is investigated to decide whether or not the write data is written on non-volatile memory 8. If the remaining storage amount is greater than or equal to a specified value, the non-volatile memory 8 is decided as the storage device for writing (S52), or if the remaining storage amount is less than the specified value, the disk 6 is decided as the storage device for writing (S56). At S54, if the number of commands is less than the specified value, the disk 6 is also decided as the storage device for writing (S56).

Figure 5:
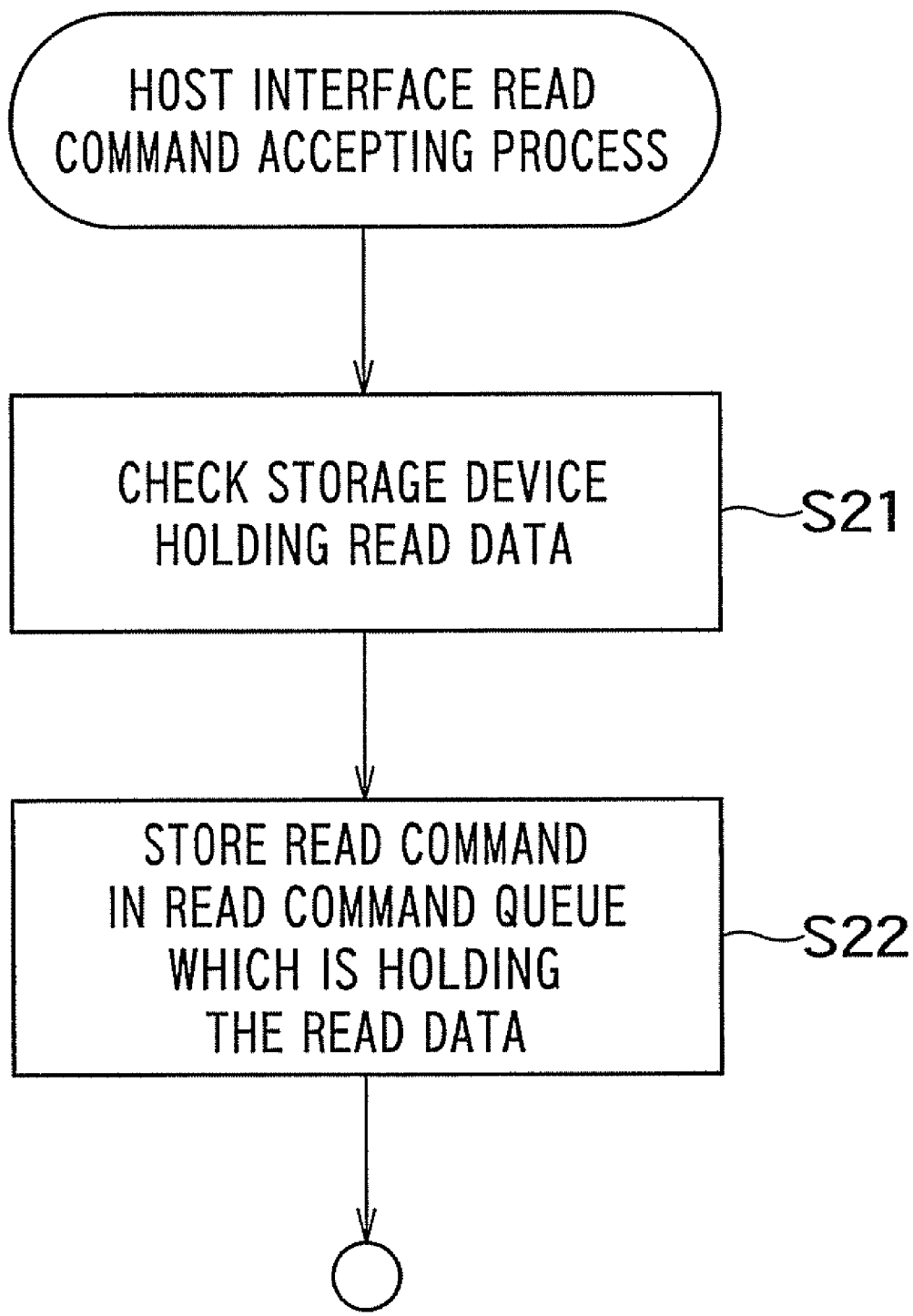
FIG. 5 is a flowchart for explaining a process to be performed where a read command is accepted.

On the other hand, if the command accepted by the host interface 9 is the read command in FIG. 2, for example, a process as shown in a flowchart of FIG. 5 is performed. First of all, it is checked in which of the disk 6 and the non-volatile memory 8 data requested to read (read data) is stored (S21). The read command for reading the required data is stored in the disk command queue 10 if data is stored in the disk 6, in the non-volatile memory command queue 11 if data is stored in the non-volatile memory 8, or in both the command queues if data is stored separately in both the disk 6 and the non-volatile memory 8(S22). Before performing the step S21, it is determined whether or not the read data exists in the cache memory 4, and if the read data exists, data may be transferred to the host 1 without performing the step S21-S22.

Figure 6:
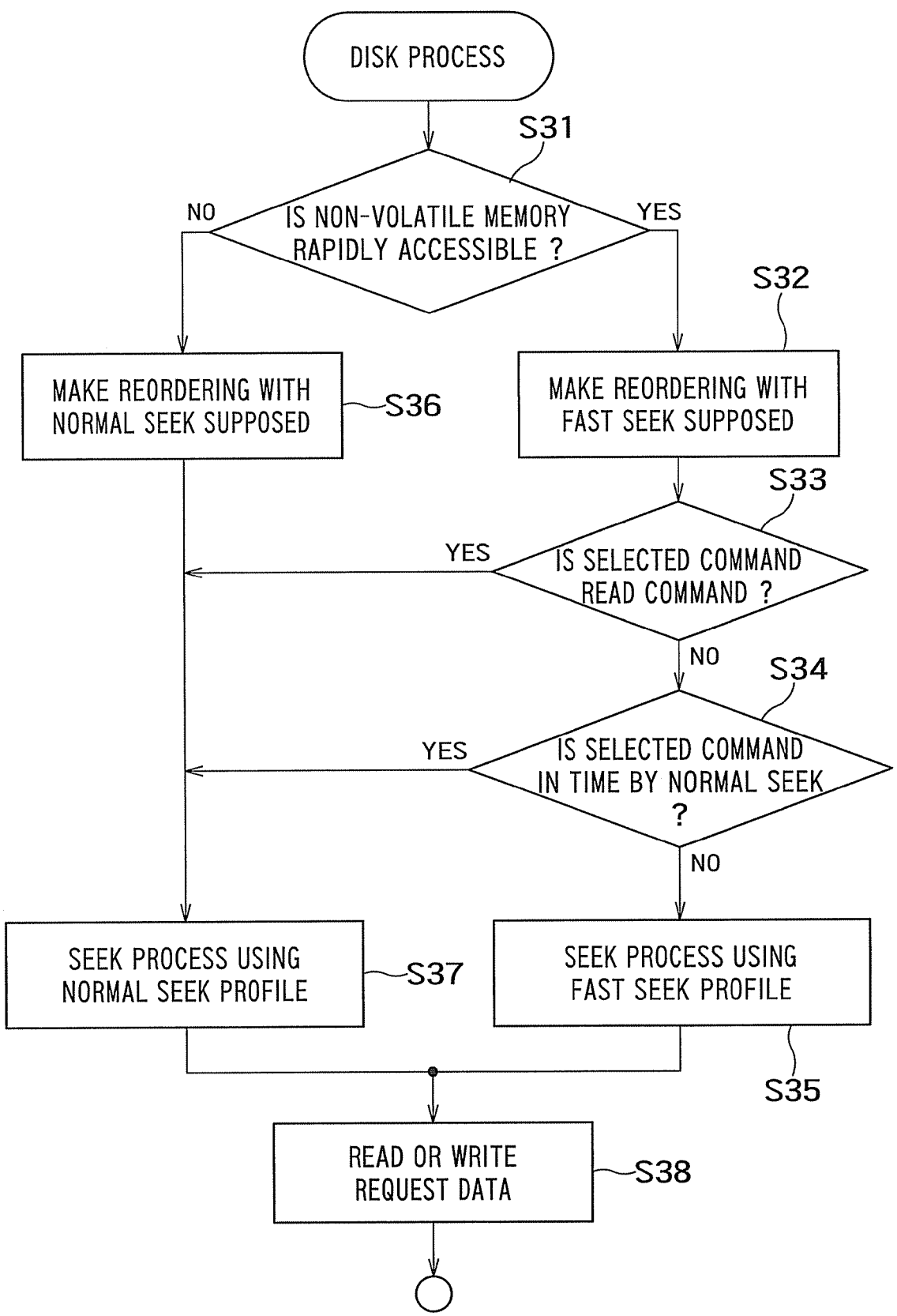
FIG. 6 is a flowchart for explaining a process to be performed where access to the disk 6 is started.

In starting the access to the disk 6, a process in accordance with a flowchart of FIG. 6 is performed with the disk access selection function 14 and the non-volatile memory rapid use determination function 12. First of all, whether or not the non-volatile memory 8 is rapidly accessible (the use situation of the non-volatile memory 8 is high or low) is examined using the non-volatile memory rapid use determination function (use situation detection unit) 12 (S31). In the non-volatile memory rapid use determination function 12, as the reference of judging whether or not the non-volatile memory 8 is rapidly accessible, there are two methods for estimating (1)

remaining storage amount of the non-volatile memory 8 and (2) access time to the non-volatile memory 8.

(1) The remaining storage amount of the non-volatile memory 8 is the current amount of storage available on the non-volatile memory 8 from which a sum of size of request data of all the write commands stored in the non-volatile memory command queue 11 is subtracted, as described above. If the remaining storage amount is greater than or equal to a specified value, it is judged that the non-volatile memory is rapidly accessible. That is, it is judged that the use situation of the non-volatile memory 8 is low.

(2) On the other hand, the access time to the non-volatile memory 8 can be estimated based on the kind (read or write) and data size of command stored in the non-volatile memory command queue 11. For example, supposing that the time required to read from the non-volatile memory 8 per sector is "a", the time required to write is "b", the total sector number for the read command stored in the non-volatile command queue 11 is "A" and the total sector number for the write command is "B", the time for executing all the commands stored in the non-volatile command queue 11 can be estimated as aA+bB. If the estimated value is less than or equal to a specified value, it is judged that the non-volatile memory 8 is rapidly accessible. That is, it is judged that the use situation of the non-volatile memory 8 is low.

As described above, at step S31, whether or not the non-volatile memory 8 is rapidly accessible is judged by estimating the remaining storage amount of the non-volatile memory 8 or the total access time of the non-volatile memory 8.

If the non-volatile memory 8 is rapidly accessible (YES at S31), data that fails to write on the disk 6 can be written into the non-volatile memory 8 at once, even if a write fault occurs, whereby the penalty of rotational delay for one rotation of the disk 6, which conventionally occurred at the time of write fault, can be reduced. Thus, supposing the high speed seek (fast seek) in which the occurrence rate of write fault is high but the efficient reordering is allowed, the reordering is performed with the disk access selection functions (second selection unit and third selection unit) 14 (S32). On the other hand, supposing that the normal speed seek (normal seek) is performed if the non-volatile memory 8 is not rapidly accessible (NO at S31), the reordering is performed with the disk access selection function 14 (S36). The normal seek is an example of a slow seek of seeking the disk head at low speed.

In the reordering at the normal speed (S36), the most rapidly accessible command (command for enabling the head to be located at the access start position most rapidly) is searched from the commands accumulated in the disk command queue 10. In this case, the access time to the command is calculated for each command, using the head position, the top position (access start position) of write or read requested data (request data) on the disk 6, and the seek time taken to make the normal seek, which is obtained from the seek time information 13 (1) for normal seek. In the following, a specific example for calculating the access time is introduced. Instead of the time, the angle on the disk 6 may be calculated.

Figure 7:
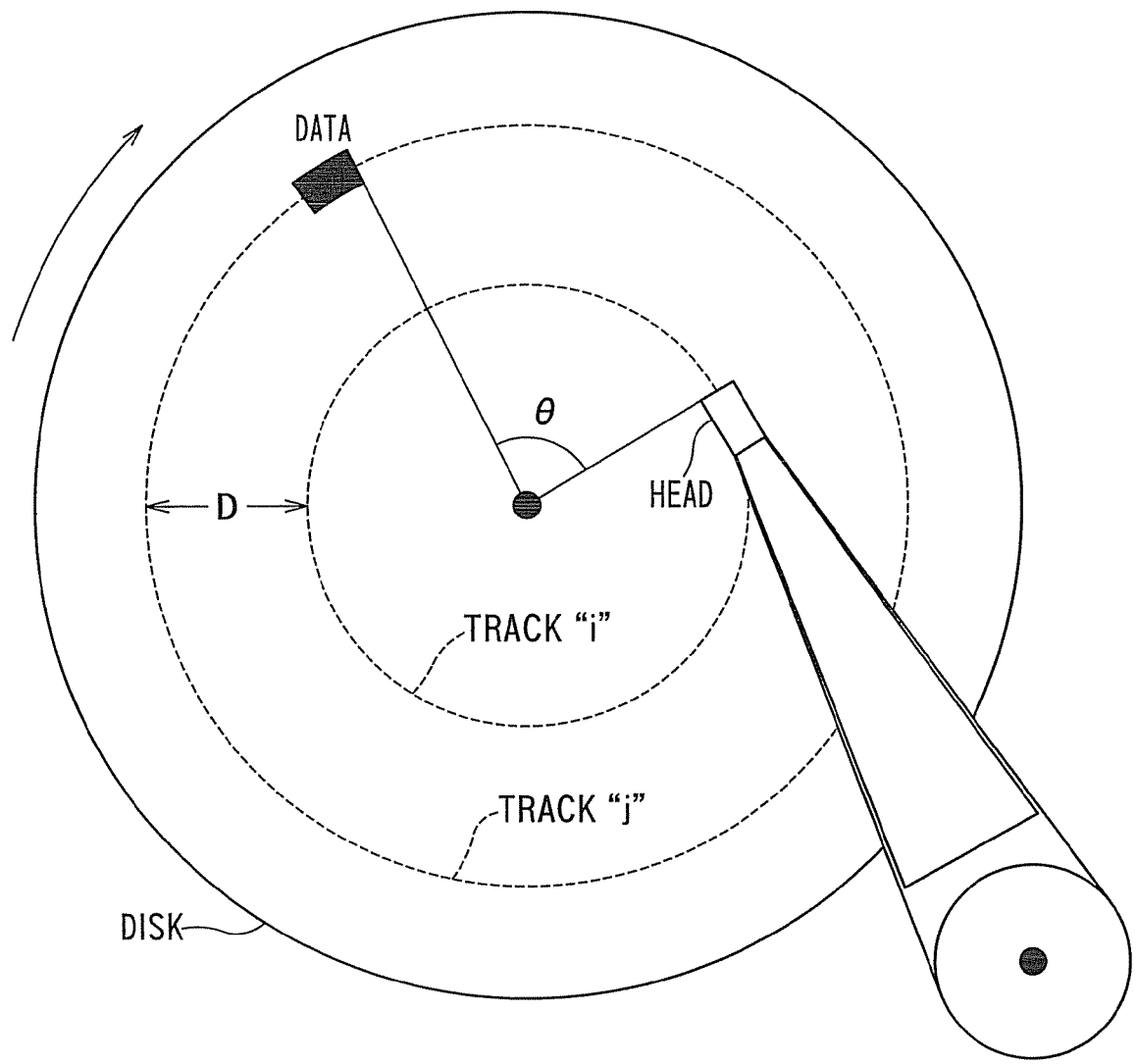
FIG. 7 is a view for explaining the angle made between the head and request data.
Figure 8:
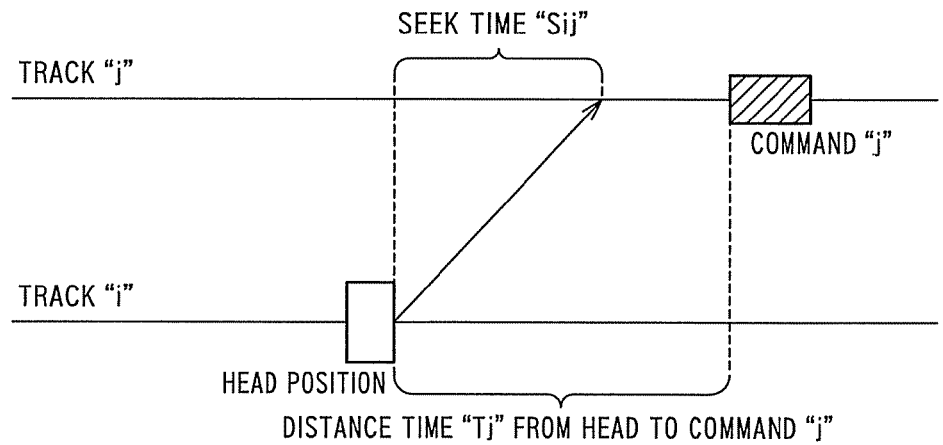
FIG. 8 is a view showing the shortest access time and the seek time.

First of all, for the command "j" (supposedly on the track "j") stored in the disk command queue 10, the angle "θ" made between the head position (supposedly on the track "i") and the top position of request data from the center of disk 6 and the track-to-track distance "D" are calculated from the head position and the top position of request data, as shown in FIG. 7. Since the rotation angle "ω" of the disk 6 is constant, the shortest access time (angle×ω=Tj) to start access to the request data from the head position can be obtained from the calculated angle, as shown in FIG. 8. On the other hand, the time "Sij" required to seek from the track "i" to the track "j" with the track-to-track distance "D" can be obtained from the seek time information 13(1), as shown in FIG. 8. The examples of the seek information (seek time information 13(1) and 13(2)) include a function with arguments "i" and "j" and a table retrievable from "i" and "j". If the seek time "Sij" is greater than the shortest access time "Tj" (Tj<Sij), the request data is passed by the head during the seek time, and cannot be accessed in the shortest access time "Tj". In this case, the access time becomes the minimum value beyond the seek time by continuing to add the rotational delay time for one rotation of the disk 6 to the shortest access time (because the rotational delay for two or more rotations may occur in some cases). That is, assuming that the number of times that the head passes the command "j" during the seek is "x", the access time is equal to Tj+(rotational delay for one rotation of disk 6)×x. The time for starting execution of the command "j" can be estimated in the above manner, whereby the command to be executed most rapidly can be searched. In consideration of the computation time of reordering and the time required for the positioning control (which may be different values for read and write), Tj>Sij+α ("α" is a considered time amount) may be the conditional expression as to whether or not the seek is in time without making the rotational delay of the disk 6.

On the other hand, in the case of reordering with the fast seek (S32), like the normal seek, the command accessible most rapidly is searched from the commands accumulated in the disk command queue 10. At this time, for the write command, the access time is calculated by obtaining the seek time taken for the fast seek from the seek time information 13(2) for the fast seek. For the read command, the seek time taken for the normal seek is obtained from the seek time information 13(1) for the normal seek. Therefore, in the reordering with the fast seek, two kinds of seek time information, including the seek time information 13(1) for the normal seek and the seek time information 13(2) for the fast seek, are required.

The reason why the fast seek is used for only the write command is that the write command can write data to any of the disk 6 and the non-volatile memory 8. When a write fault occurs, the write command can write into the non-volatile memory 8, instead of the disk 6, whereby the penalty of rotational delay is reduced. On the other hand, in the case of the read command, data requested by the host is not always stored in both the disk 6 and the non-volatile memory 8. Therefore, when the read fault occurs, the data cannot be necessarily read from the non-volatile memory 8.

Figure 9:
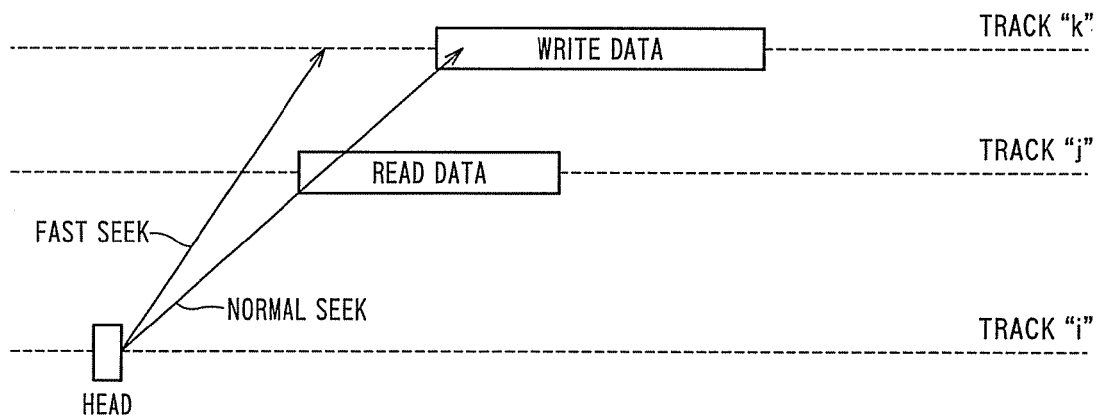
FIG. 9 is a view for explaining the fast reordering.

An instance is considered where the head exists on the track "i", the read data requested to read by the read command exists on the track "j" and the write data requested to write by the write command exists on the track "k", in which the read data is located closer to the head, as shown in FIG. 9. In this instance, since the fast seek is not performed for the read command, there is an excess rotational delay for one rotation for the head to be located at the read data. On the other hand, for the write data to make the fast seek, because the head can complete moving before passing the data, there is no rotational delay. Accordingly, in a situation of FIG. 9, when the fast reordering is made, the write command is selected.

If the command selected by the reordering with the fast seek at S32 is the write command (NO at S33), it is checked whether or not the execution start time (access start time) of this write command is equal to the execution start time where this write command is accessed at the normal seek (S34). That is, it is checked whether or not the access time to this write command with the fast seek is equal to the access time in the case of the normal seek. This is because the command selected by the reordering with the fast seek is not necessarily subjected to the fast seek. If the access time is not changed with the normal seek (YES at S34), access is made by the normal seek, but not the fast seek with high write fault occurrence rate.

If it is decided that the normal seek is performed (NO at S31, YES at S33 or YES at S34), a seek controller 17 seeks the head by referring to the seek profile information 15(1) for the normal seek (S37). On the other hand, if it is decided that the fast seek is performed (NO at S34), the seek controller 17 seeks the head by referring to the seek profile information 15(2) for the fast seek (S35). Since the seek controller 17 performs at least two kinds of seek (normal seek and fast seek), two kinds of seek profile information, including the seek profile information 15(1) for the normal seek and the seek profile information 15(2) for the fast seek, are required. In the fast seek at S35 and the normal seek at S37, the just-in-time seek control may be made to decrease the vibration at the completion time of seek and suppress occurrence of the write fault. The just-in-time seek control involves adjusting the seek speed to minimize the rotational delay time after the completion of seek. It is well known that the power consumption can be saved by this control (refer to JP-A 2000-40317 (Kokai)). Herein, the seek profile information will be briefly described as follows. The head seek control generally involves making the feedback control by setting the target speed for the track-to-track distance between the track where the head is located and the target track. That is, the seek controller 17 increases or decreases the seek speed to become the target speed in accordance with the track-to-track distance during the seek. When the target speed is obtained from the track-to-track distance, the seek profile information is used. The seek profile information may be held as a table storing the target speed for the track-to-track distance, a function with the argument of the track-to-track distance to return the target speed or the coefficient information of the function (e.g., refer to JP-A 9-73618 (Kokai)).

The head is located at the object track (track "j" in FIG. 8) by the fast seek at S35 or the normal seek at S37. After waiting for the request data to be located directly under the head by the rotational delay, the data is read or written (S38). In the case of the read command, the read data is stored in the cache memory 4, and the transfer of data to the host 1 is started. In the case of the write command, the execution of the command is completed when writing the write requested data is ended.

If the disk interface 5 detects a write disabled signal (write error signal) during the writing onto the disk 6 (the write fault occurs) at S38, the write process is stopped immediately and the write fault process is performed. When the write disabled signal occurs, a phenomenon causing the write to be disabled can be known. For the error occurrence, there are a positioning control error in which the head cannot be controlled to the correct position, an error due to an external factor of impact detection or power failure, or an error due to the defect of the disk 6 in which the read or write on the disk 6 is not normally made.

Figure 10:
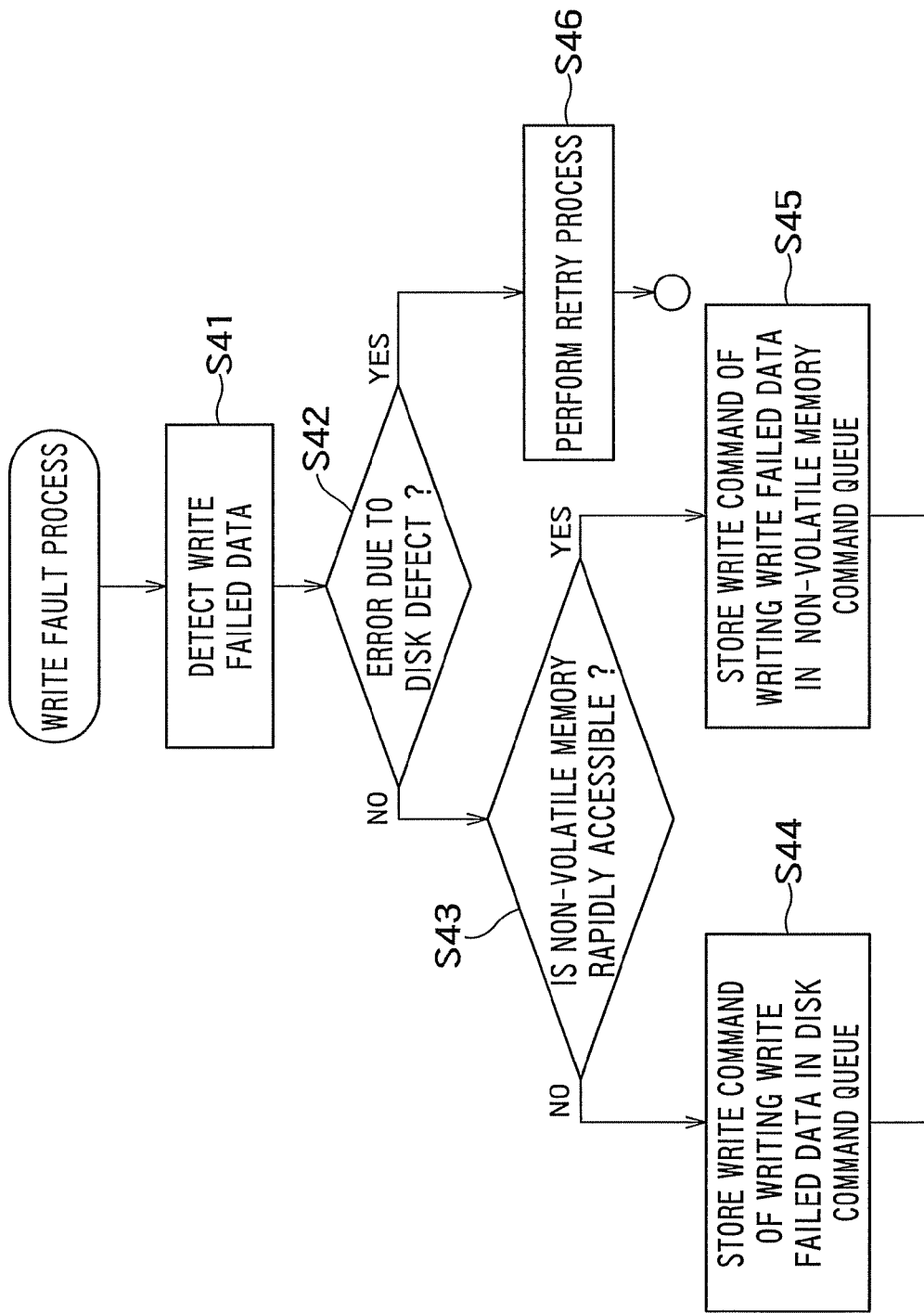
FIG. 10 is a flowchart showing the flow of a write fault process.
Figure 11:
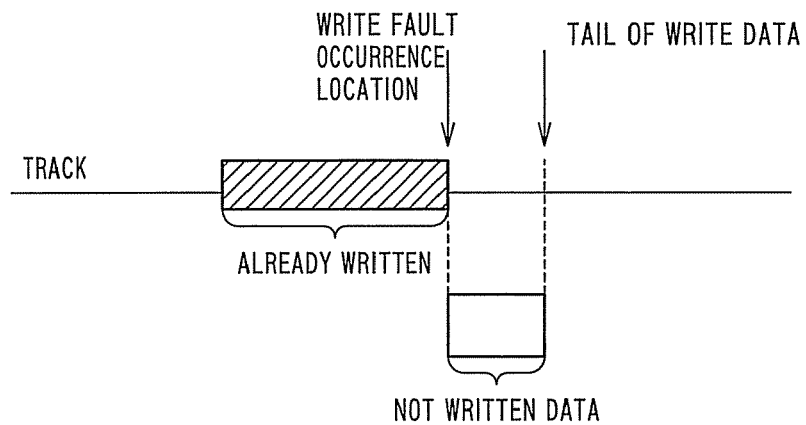
FIG. 11 is a view for explaining a detection example of write failed data.
Figure 12:
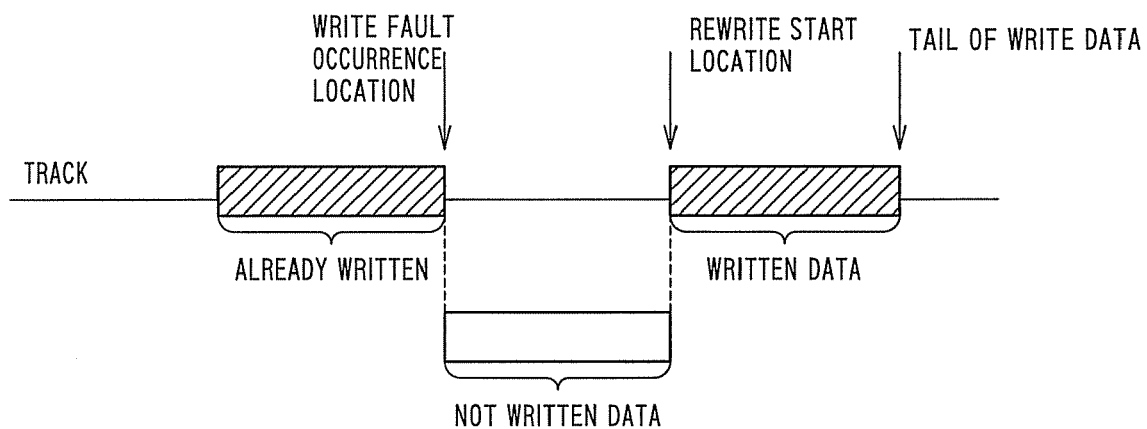
FIG. 12 is a view for explaining a detection example of write failed data.

FIG. 10 is a flowchart showing the flow of the write fault process. At S41, write failed data is detected. In detecting the write failed data, it is desirable to perform different processings depending on the size of write requested data. Specifically, if the tail of write data is near the write fault occurrence location, data from the write data occurrence location to the tail of write data is detected as the write failed data, when the write fault occurs, as shown in FIG. 11. On the other hand, when the size of write data is large, or when the write requests with consecutive addresses continue (a plurality of write commands with consecutive addresses are collectively processed), the error is released before the head is located at the tail of write data, and the write can be started again, because the distance from the write fault occurrence location to the tail of write data is very long, as shown in FIG. 12. The disk interface 5 waits for a write enabled signal to be sent from the disk 6, and resumes to write when the write is enabled. At this time, the data from the location where the write fault occurs to the location where the write is started again is detected as the write failed data.

At S42, it is determined whether or not the error occurrence cause is due to the defect of the disk 6. If the error occurrence cause is due to the defect of the disk 6(YES at S42), a retry process is performed. In the retry process, the data is written again at the same address, and it is checked whether or not the position on the disk 6 is defective. Therefore, every time the rewrite is made, there is a rotational delay for one rotation of the disk 6. If the disk 6 is judged as defective, the position on the disk 6 is registered as the defective sector, and the data is stored at an alternative position. The alternative position may be provided in any of the disk 6 and the non-volatile memory 8.

If it is judged that the error occurrence cause is not the defect of the disk 6(NO at S42), it is examined again whether or not the non-volatile memory 8 is rapidly accessible by the non-volatile memory rapid use determination function 12 (S43). If the non-volatile memory 8 is rapidly accessible (YES at S43), the write command for writing the write failed data detected at S41 is stored in the non-volatile memory command queue 11 (S45). That is, the disk interface 5 has a write error processing unit for generating the write command for writing the write failed data, and storing the generated write command in the non-volatile memory command queue 11 if a write error for the disk 6 occurs. On the other hand, if the non-volatile memory 8 is not rapidly accessible in this situation (NO at S43), the write command for writing the write failed data is stored in the disk command queue 10 (S44). Here, the review at S43 may be omitted, using the determination result as to whether or not the non-volatile memory 8 is rapidly accessible, which is performed at S31 in FIG. 6. That is, if it is determined at S31 that the non-volatile memory 8 is rapidly accessible, the operation directly goes from S42 to S45, or otherwise, the operation directly goes from S42 to S44.

Figure 13:
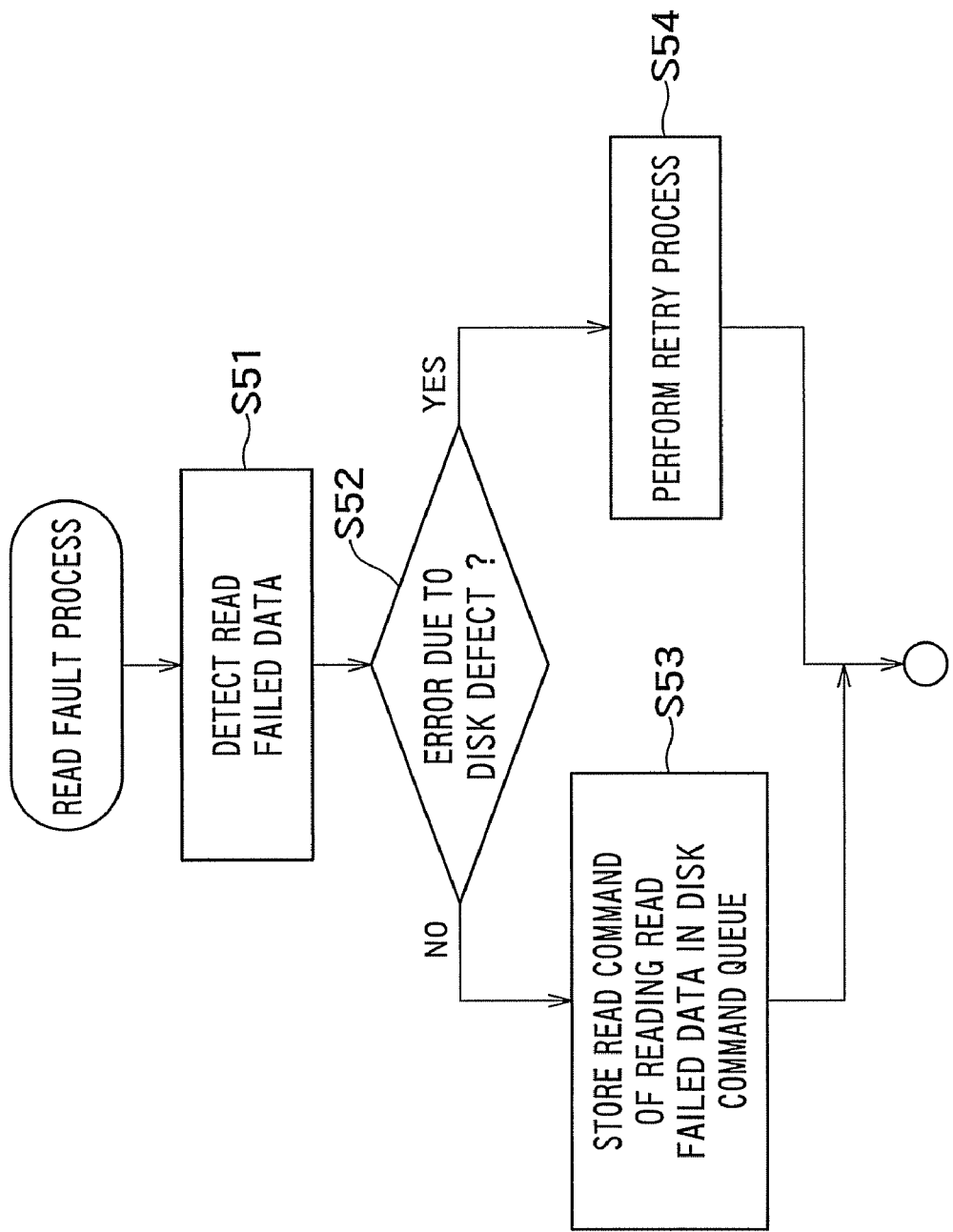
FIG. 13 is a flowchart showing the flow of a read fault process.
Figure 14:
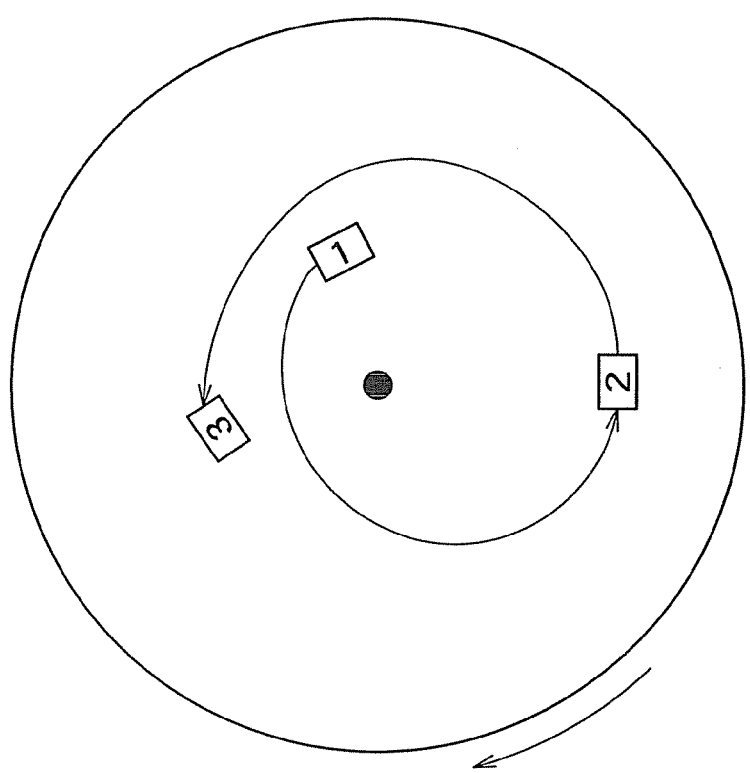
FIG. 14 is a view for explaining the effects of reordering.
Figure 14:
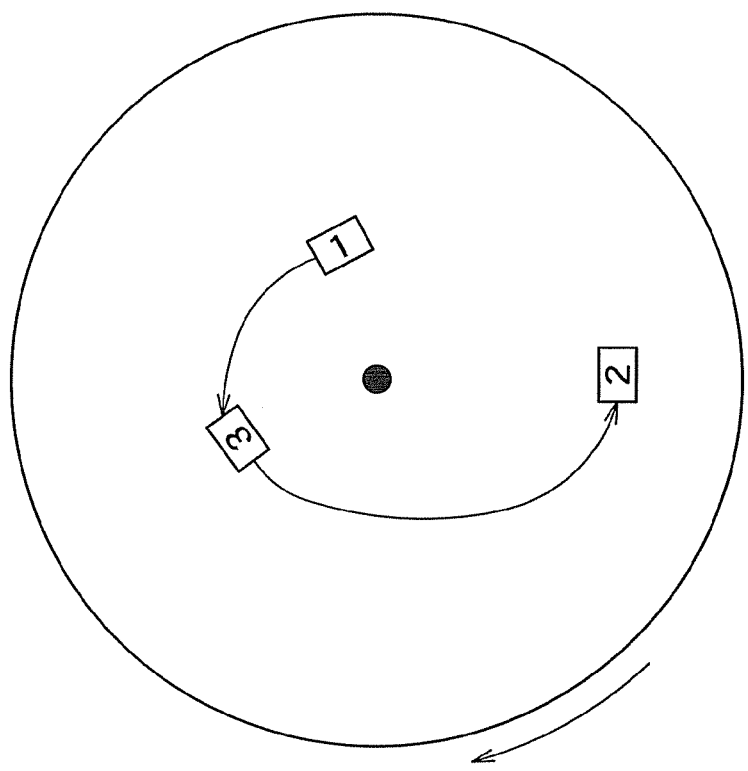
Figure 15:
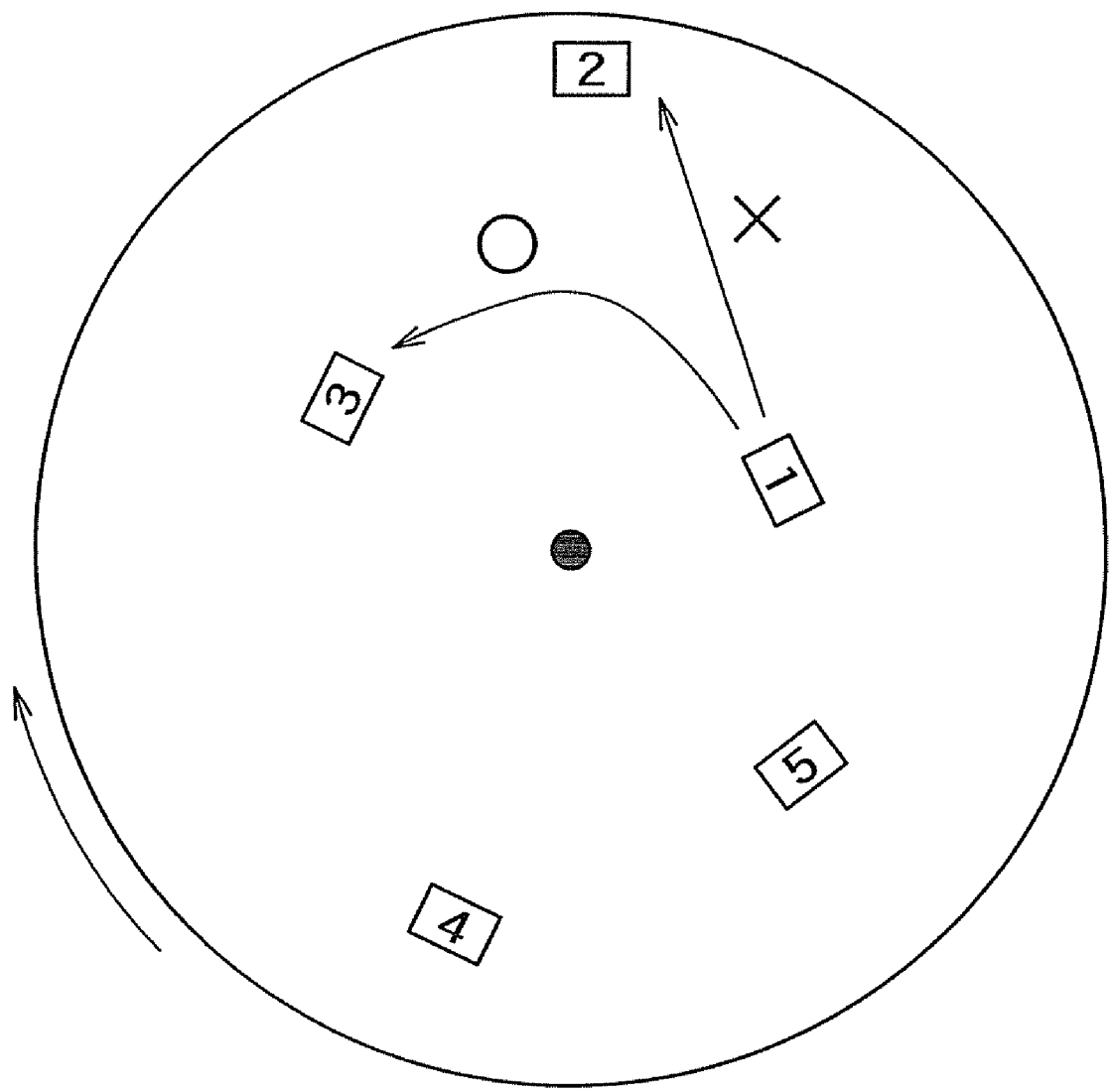
FIG. 15 is a view for explaining an STF (Shortest Time First) algorithm.
Figure 16:
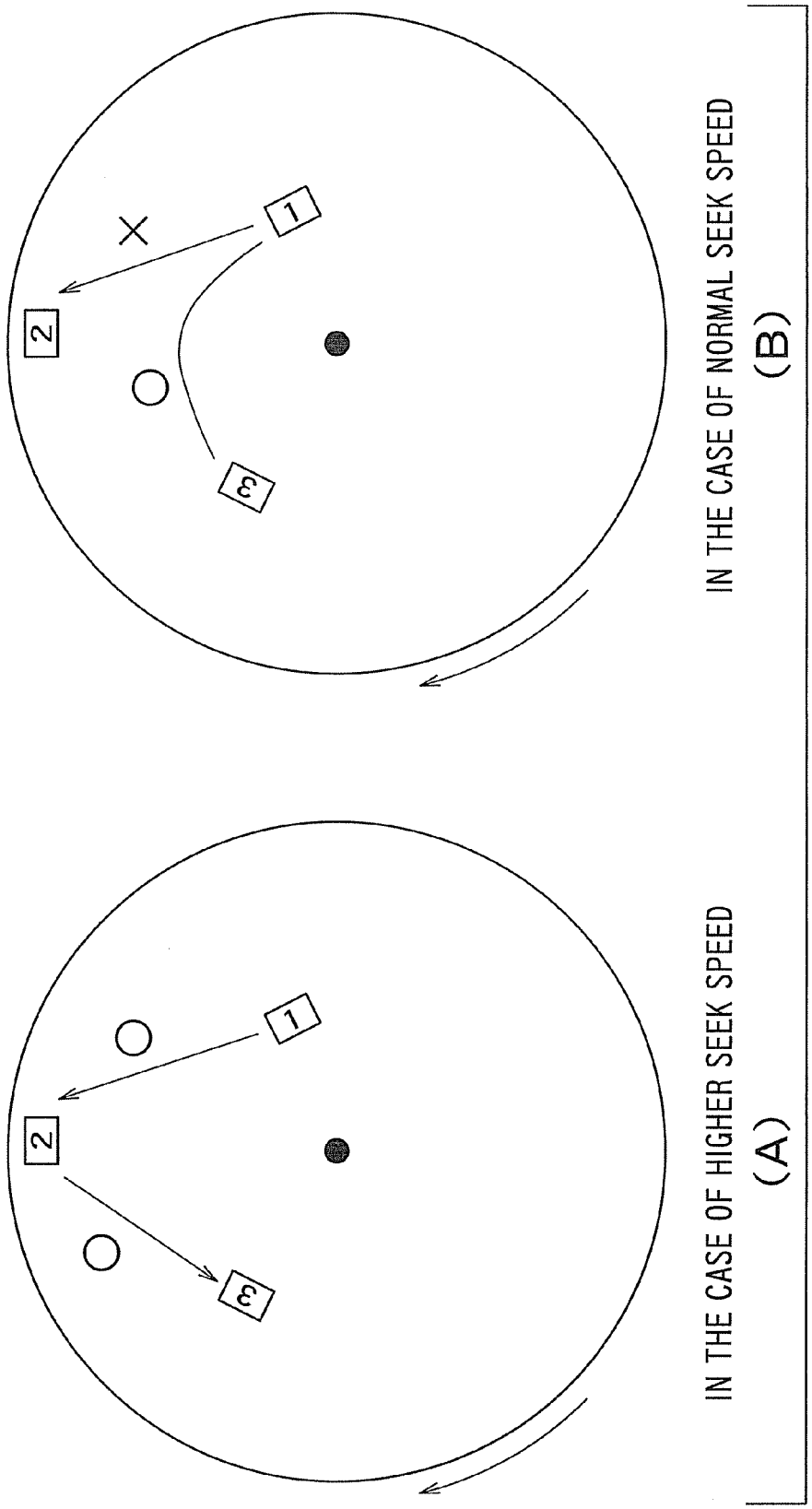
FIG. 16 is a view for explaining a normal seek and a fast seek.
Figure 17:
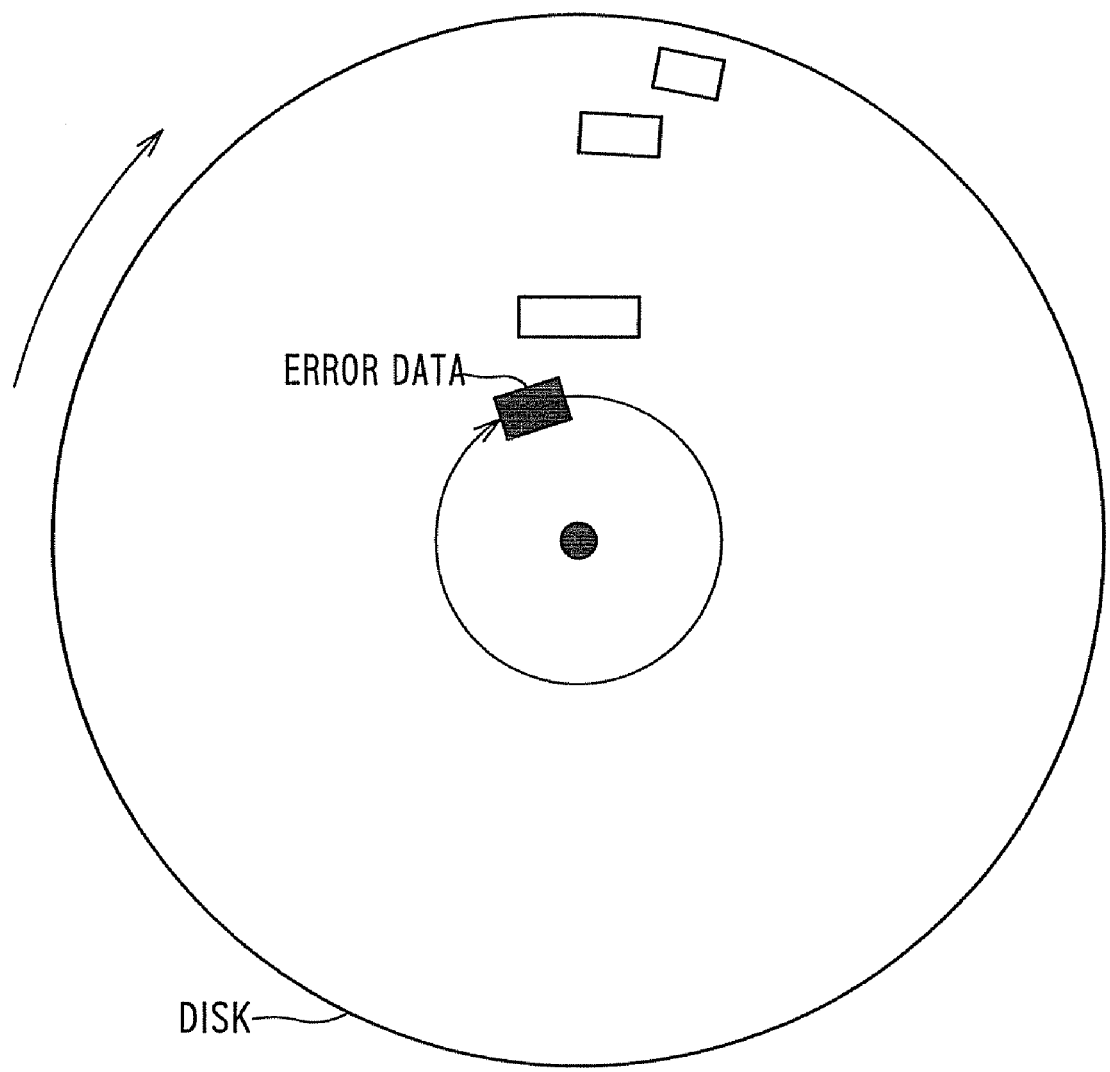
FIG. 17 is a view for explaining the penalty of write fault.

In FIG. 6, if a read disabled signal (read error signal) is received (the read fault occurs) during the reading at S38, the read process is stopped immediately, whereby the read fault process is performed. Like the write fault, when the read disabled signal occurs, a phenomenon causing the read to be disabled can be known, whereby it is possible to detect a positioning control error, an external factor error and a disk defect error. FIG. 13 shows a flowchart of the read fault process. The read failed data is detected (S51), and it is judged whether or not the cause of the read fault is the defect on the disk (S52). If there is possibility of the defect on the disk 6(YES at S52), the retry process is performed (S54). In this retry process, the request data is read again. If the request data cannot be read, a read error is notified to the host 1. If it is judged that the cause of the read fault is not the defect on the disk 6(NO at S52), the read command for reading the read failed data is stored in the disk command queue 10 (S53).

Returning to FIG. 2, the non-volatile memory access selection function (first selection unit) 16 selects a command to be executed from the commands stored in the non-volatile command queue 11 and sends the selected command to the non-volatile memory interface (access controller) 7. The non-volatile memory interface 7 executes the accepted command to read or write the data from or to the non-volatile memory 8. A command selection method with the non-volatile memory access selection function 16 involves selecting the commands in the order in which they are stored in the non-volatile memory command queue 11 or selecting the commands in the order in which they are read (high processing speed). If the read command is executed, the read data is stored in the cache memory 4, and the transfer of the data to the host 1 is started. If the write command is executed, the execution of command is completed when writing the write requested data is ended.

To free the space of the non-volatile memory 8, a process for writing the data stored in the non-volatile memory 8 onto the disk 6 may be performed. This process is desirably performed when there is less influence on the throughput. For example, when there is no command stored in the disk command queue 10 and the non-volatile command queue 11. In this process, the data desired to write onto the disk 6 is read from the non-volatile memory 8 to the cache memory 4. At this time, the data may be read by registering the read command in the non-volatile memory command queue 11. Next, the read data in the cache memory 4 is written onto the disk 6. At this time, the write command may be stored in the disk command queue 10.

What is claimed is:

1. A hard disk drive comprising:
    a disk-like storage medium configured to be capable of reading and writing data;
    a seek controller configured to control a disk head to make a fast seek of seeking the disk head at high speed or a slow seek of seeking the disk head at low speed to read or write the data based on a read command or a write command requested for execution;
    a non-volatile memory configured to be capable of reading and writing the data;
    an access controller configured to read or write the data from or into the non-volatile memory based on the read command or the write command requested for execution;
    a command receiver configured to receive the write command or the read command of reading or writing the data from a host;
    a decision unit configured to decide which of the seek controller and the access controller performs the command received by the command receiver;
    a first command storage configured to store write commands and read commands decided to be executed by the seek controller;
    a second command storage configured to store write commands and read commands decided to be executed by the access controller;
    a first selection unit configured to select the command from the second command storage and request the access controller to execute selected command;
    a use situation detection unit configured to detect a use situation of the non-volatile memory;
    a second selection unit configured to
        select, when the use situation is low, the command which enables the disk head to be located at a start position of writing or reading most rapidly from among the write commands and the read commands stored in the first command storage assuming that the disk head performs the fast seek for the write command and the slow seek for the read command and
        request the seek controller to execute selected command by designating the fast seek if the selected command is the write command and by designating the slow seek if the selected command is the read command;
    a write error processing unit configured to detect a write error during execution of the write command requested by the second selection unit and store a write command for writing write failed data, in the second command storage; and
    a third selection unit configured to
        select, when the use situation of the non-volatile memory is high, the command which enables the disk head to be located at the start position of writing or reading most rapidly from among the write commands and the read commands stored in the first command storage assuming that the disk head performs the slow seek and
        request the seek controller to execute selected command by designating the slow seek.

2. The drive according to claim 1, wherein
    the use situation detection unit detects the use situation of the non-volatile memory when the write error processing unit detects a write error, and
    the write error processing unit stores the write command for writing the write failed data, in the second command storage when the user situation of the non-volatile memory is low, and stores the write command for writing the failed data, in the first command storage when the use situation of the non-volatile memory is high.

3. The drive according to claim 1, wherein
    the use situation detection unit detects, as the use situation of the non-volatile memory, a remaining storage amount that is a storage amount available on the non-volatile memory from which a total amount of data requested to write by the write commands in the second command storage is subtracted, and
    the second selection unit judges that the use situation is low when the remaining storage amount is greater than or equal to a first threshold value.

4. The drive according to claim 2, wherein
    the use situation detection unit detects, as the use situation of the non-volatile memory, a remaining storage amount that is an storage amount available on the non-volatile memory from which a total amount of data requested to write by the write commands in the second storage is subtracted, and
    the write error processing unit judges that the use situation is low when the remaining storage amount is greater than or equal to a first threshold value.

5. The drive according to claim 1, wherein
    the use situation detection unit computes, as the use situation of the non-volatile memory, a total time required to execute the write commands and the read commands in the second command storage, and
    the second selection unit judges that the use situation is low when the total time is lower than or equal to a second threshold value.

6. The drive according to claim 2, wherein
    the use situation detection unit computes, as the use situation of the non-volatile memory, a total time required to execute the write commands and the read commands in the second command storage, and
    the write error processing unit judges that the use situation is low when the total time is lower than or equal to a second threshold value.

7. The drive according to claim 1, wherein the second selection unit compares a start time of writing in a case where the disk head makes the fast seek with a start time of writing in a case where the disk head makes the slow seek for the selected command if the selected command is the write command, and designates the slow seek for the seek controller when those start times are identical to each other.

8. The drive according to claim 1, wherein the write error processing unit detects, as the write failed data, data following a location where the error occurs among the data requested to write by the write command.

9. The drive according to claim 1, wherein the seek controller waits until a write error is released, if the write error occurs during execution of the write command, and resumes to write if the error is released, and the write error processing unit detects, as the write failed data, data from a location where the error occurs to a location where the write is resumed among the data requested to write by the write command.

10. The drive according to claim 1, wherein the decision unit decides which of the seek controller and the access controller executes the command received by the command receiver, using at least one of an on/off state of a disk motor for driving and rotating the disk-like storage medium, the number of commands within the first command storage, and a remaining storage amount that is an storage amount available on the non-volatile memory from which a total amount of data requested to write by the write commands in the second command storage is subtracted.

11. A command execution method performed in a hard disk drive which includes a disk-like storage medium configured to be capable of reading and writing data and a non-volatile memory configured to be capable of reading and writing data, comprising;

receiving a write command and a read command of reading or writing the data from a host;

deciding for which of the disk-like storage medium and the non-volatile memory to execute the write command or the read command;

store the write command or the read command in a first command storage when the disk-like storage medium is decided and in a second command when the non-volatile memory is decided;

detecting a use situation of the non-volatile memory;

selecting, when the use situation is low, the command which enables the disk head to be located at a start position of writing or reading most rapidly from among the write commands and the read commands stored in the first command storage assuming that the disk head performs the fast seek for the write command and the slow seek for the read command;

executing selected command by the fast seek when the selected command is the write command and by the slow seek when the selected command is the read command;

store write command for writing write failed data, in the second command storage when a write error is detected during execution of the write command;

selecting, when the use situation of the non-volatile memory is high, the command which enables the disk head to be located at the start position of writing or reading most rapidly from among the write commands and the read commands stored in the first command storage assuming that the disk head performs the slow seek; and executing selected command by the slow seek.

\* \* \* \* \*